United States Patent
Wiech et al.

(10) Patent No.: US 10,167,026 B2
(45) Date of Patent: Jan. 1, 2019

(54) SPOILER ARRANGEMENT FOR A MOTOR VEHICLE

(71) Applicant: GM GLOBAL TECHNOLOGY OPERATIONS LLC, Detroit, MI (US)

(72) Inventors: Thomas Wiech, Ruesselsheim (DE); Fabian Fuerst, Ruesselsheim (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/682,687

(22) Filed: Aug. 22, 2017

(65) Prior Publication Data

US 2018/0057078 A1    Mar. 1, 2018

(30) Foreign Application Priority Data

Aug. 25, 2016 (DE) .................. 10 2016 010 321

(51) Int. Cl.
*B62D 35/00* (2006.01)
*B62D 35/02* (2006.01)
*B62D 37/02* (2006.01)

(52) U.S. Cl.
CPC .......... *B62D 35/005* (2013.01); *B62D 37/02* (2013.01)

(58) Field of Classification Search
CPC .............................. B62D 35/005; B62D 35/02
USPC ....................................................... 296/180.5
See application file for complete search history.

(56) References Cited

U.S. PATENT DOCUMENTS

| | | | |
|---|---|---|---|
| 2013/0049399 A1* | 2/2013 | Hoelzel ............... | B62D 35/005 296/180.5 |
| 2014/0175831 A1* | 6/2014 | Hoelzel ............... | B62D 35/005 296/180.5 |
| 2015/0197292 A1* | 7/2015 | Smith .................. | B62D 35/007 296/180.4 |
| 2017/0101136 A1* | 4/2017 | Zielinski ............. | B62D 35/005 |
| 2017/0166267 A1* | 6/2017 | Ribaldone ........... | B62D 35/005 |
| 2017/0334282 A1* | 11/2017 | Eckstein ............... | B60K 11/02 |
| 2018/0057078 A1* | 3/2018 | Wiech .................... | B62D 37/02 |
| 2018/0162459 A1* | 6/2018 | Abdoul Azizou ...... | H02P 6/182 |

\* cited by examiner

*Primary Examiner* — Gregory A Blankenship
(74) *Attorney, Agent, or Firm* — Lorenz & Kopf, LLP

(57) ABSTRACT

A spoiler arrangement for a motor vehicle includes a carrier configured to attach on a body of the motor vehicle. At least one lamella is arranged on the carrier and includes a longitudinally extended flexible and elastic bending rod and at least one surface segment. The surface segment is connected to the bending rod along a side edge.

17 Claims, 4 Drawing Sheets

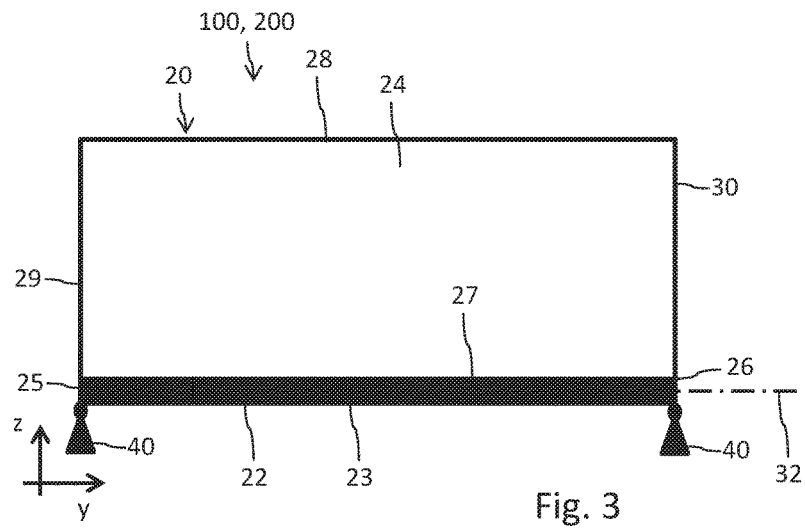
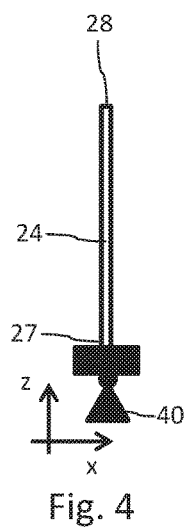
Fig. 3
Fig. 4
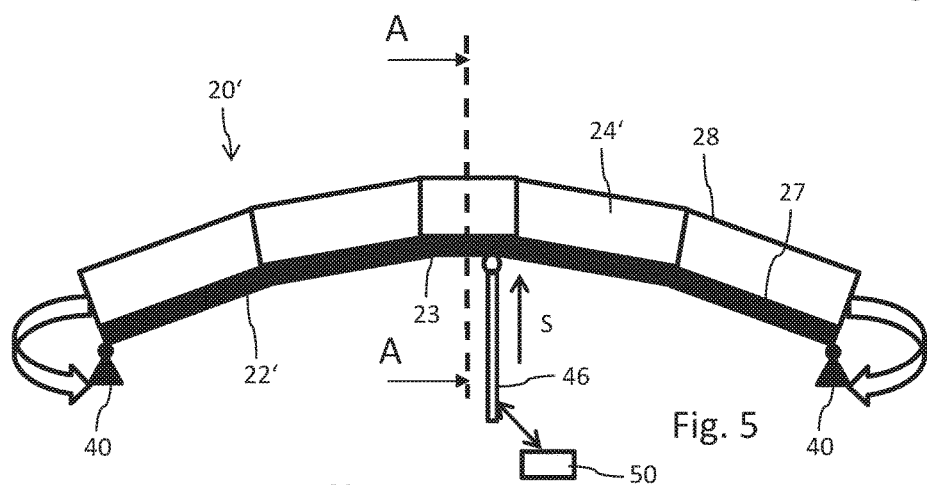
Fig. 5
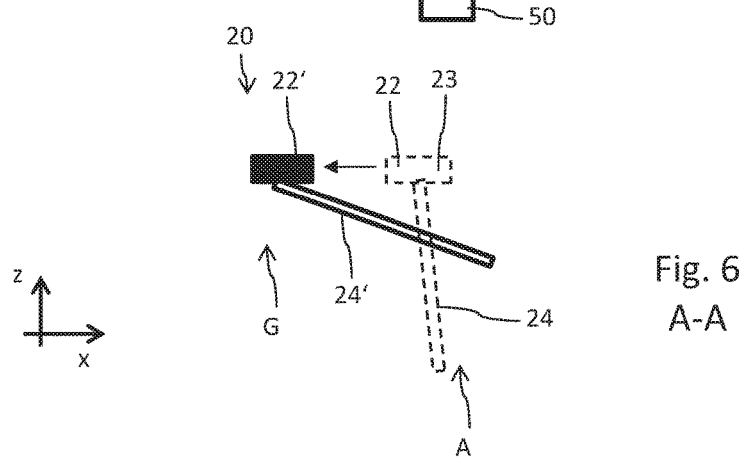
Fig. 6
A-A

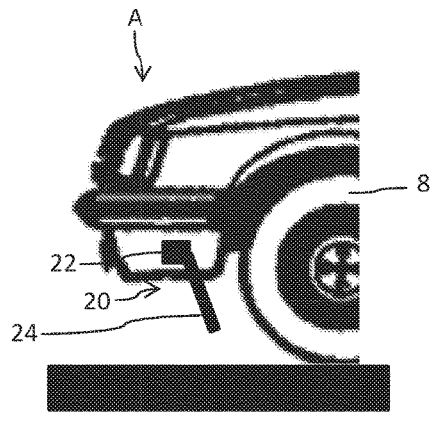
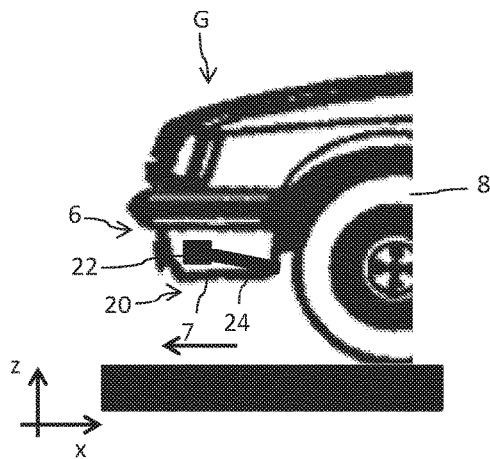
Fig. 7    Fig. 8
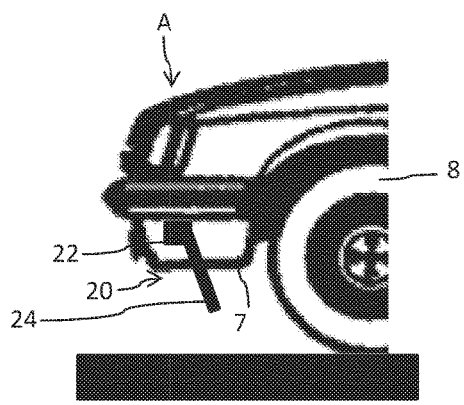
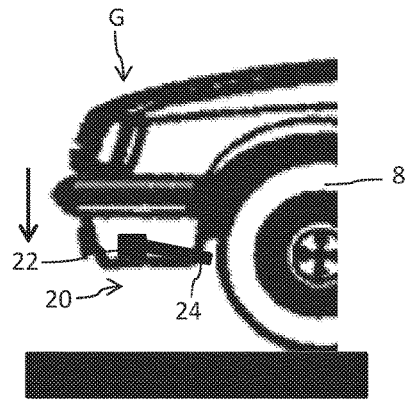
Fig. 9    Fig. 10

SPOILER ARRANGEMENT FOR A MOTOR VEHICLE

CROSS-REFERENCE TO RELATED APPLICATION

This application claims priority to German Patent Application No. 102016010321.3, filed Aug. 25, 2016, which is incorporated herein by reference in its entirety.

TECHNICAL FIELD

The present invention relates to a spoiler arrangement for a motor vehicle, to be arranged particularly in the area of a vehicle front. In addition, a motor vehicle equipped with such a spoiler arrangement is provided.

BACKGROUND

Adjustable spoiler arrangements for motor vehicles are well-known in the prior art. They are used to adequately adjust the wind resistance of a motor vehicle and, for example, are supposed to perform a spoiler or aerodynamic function only within a predetermined speed range of the motor vehicle. In a comparatively low speed range, a spoiler extended to its action position can be rather hindering. When driving in a comparatively high speed range, movable spoiler arrangement can be provided not only at the rear but also at the vehicle front, by means of which the flow properties and the wind resistance of the motor vehicle can be improved and optimized.

Popular movable spoiler arrangements comprise a plurality of movable, e.g. slidable or pivotable components, which frequently are to be adequately moved and adjusted by means of separate drives, e.g. by means of actuating drives For example, form DE 10 2012 020 738 A1, a flexible front spoiler system having a pneumatic actuation is known.

SUMMARY

In contrast, the problem addressed by the present invention is that of providing an improved spoiler arrangement, having particularly simple and robust kinematics, having as few components as possible, and furthermore having a design which is as simple, compact and robust as possible, and which allows for a preferably low-maintenance long-term operation.

Accordingly, a spoiler arrangement for a motor vehicle is provided. The spoiler arrangement comprises a carrier which can be or is arranged on a body of the motor vehicle. The spoiler arrangement further comprises at least one lamella arranged on the carrier, said lamella having a longitudinally extended flexible and elastic bending rod as well as a surface segment. The surface segment is connected to the bending rod along a side edge. The surface segment can particularly be made of an inelastic material. The surface segment typically extends along the longitudinal direction of the bending rod.

Typically, the surface segment is continuously connected to and firmly secured on the bending rod along its entire longitudinal extension. The lamella can be formed solely by the bending rod or by at least one surface segment firmly secured on the bending rod. The surface segment and the bending rod can have an approximately identical extension in the longitudinal direction of the bending rod. In such case, the bending rod can be designed so as to be slightly longer than the surface segment. This allows particularly for a linkage of the lamella to the carrier by means of the bending rod.

The at least one lamella is typically non-rotatably arranged on the carrier. It can thus not be pivoted relative to the carrier between a basic position and an action position with regard to an imaginary rotational axis which runs along or parallel to the bending rod. Instead, a deformation of the bending rod is provided, and the surface segment connected to the bending rod is consequently subject to a type of swivel or buckling movement. The swivel or buckling movement of the surface segment is controlled by the degree of the geometric deformation of the bending rod. The swivel or buckling movement can be continuously adjusted in accordance with the degree of deformation of the bending rod.

The surface segment typically has a largely plane, for example rectangular basic geometry. Along a longitudinal side, the surface segment is connected to the longitudinally extended bending rod. A bending of the bending rod along a predetermined bending direction, which either corresponds to the plane of the surface segment or is aligned approximately perpendicularly to the plane of the surface segment, results in a deformation of the surface segment such that the surface segment, relative to the bending rod, executes a swivel or buckling movement with the bending rod as swivel or buckling axis, wherein the bending rod itself is non-rotatably arranged on the carrier.

Correspondingly to its swivel or buckling movement, the surface segment extends in an area of the motor vehicle body that is exposed to the airstream.

According to a development, the bending rod has two opposite longitudinal ends which are each arranged on the carrier. With regard to a plane which extends perpendicularly to the longitudinal extension of the carrier, the longitudinal ends of the bending rod are each firmly secured on the carrier. The bending rod is also non-rotatably arranged on the carrier. The securing of the two opposite longitudinal ends of the carrier allows for a particularly compact design of the spoiler arrangement and its carrier. The areas of the carrier that receive the opposite longitudinal ends of the at least one bending rod, can be designed without actuators for an adjustment of the lamella and thus be actuator-free. This allows for a particularly simple and compact design of the carrier and the entire spoiler arrangement.

According to a further embodiment, at least one longitudinal end of the bending rod is guided slidably on the carrier in longitudinal direction of the bending rod. For example, on the side of the carrier, a longitudinal guide can be provided for a longitudinal end of a bending rod. By means of a longitudinal guide, for example, an arch-shaped deformation of the initially straight bending rod is made possible. An arch-shaped deformation of the bending rod typically results in a shortening of the distance between the opposite longitudinal ends of the bending rod. The longitudinal guide on the carrier ensures that the bending rod remains connected to the carrier despite a bending or deformation.

According to a further embodiment, the surface segment, due to a deformation of the bending rod, is subject to a swivel or buckling movement with the bending rod as swivel or buckling axis. The swivel or buckling axis of the surface segment can also lie outside of the bending rod. Typically, the imaginary swivel or buckling axis of the surface segment extends approximately parallel to the longitudinal extension of the bending rod.

It can be particularly provided that the surface segment is largely inelastic. Particularly its areas which are facing away from the bending rod cannot at all or only to a limited extent follow a bending movement or an elastic deformation of the bending rod. Accordingly, it is subject to a swivel or buckling movement, when the bending rod is geometrically deformed in a predetermined manner.

In this manner, an effective swiveling or buckling of the surface segment for increasing or decreasing a surface of the lamella, onto which air can flow, can also be achieved without a pivotable mounting of the bending rod. By providing at least one lamella comprising a bending rod and a surface segment connected to said bending rod, a movement comparable to a swivel movement can be performed, however, with the difference that for a swiveling or buckling of the surface segment, no rotational movement of the bending rod but merely a geometrical deformation of the bending rod is to be provided.

According to a further embodiment of the spoiler arrangement, a middle section of the bending rod is deformable perpendicularly to the longitudinal direction of the bending rod for a swiveling or buckling of the surface segment between a basic position and an action position.

The middle section of the bending rod can, for example, lie approximately centered between the opposite longitudinal ends of the bending rod. However, the middle section can also be a middle area of the bending rod which extends in longitudinal direction of the bending rod between the opposite longitudinal ends of the bending rod. In the basic position, the lamella bears against a body section in an extensively plane manner, while in its action position, at least sections of the lamella protrude from the body or an outer paneling of the motor vehicle in order to perform a required aerodynamic function.

The middle section of the bending rod can comprise up to 50% or up to 80% of the longitudinal extension of the bending rod. The bending rod, particularly its middle section, can be deformable not only perpendicularly to the longitudinal extension of the bending rod but also perpendicularly to the plane of the surface segment.

It is further conceivable that the bending rod is deformable perpendicularly to its longitudinal extension in a direction that corresponds to the plane of the surface segment. As a result of such a bending of the bending rod, an area of the surface segment directly adjacent to the bending rod is subject to less deformation than an area of the surface segment that faces away from the bending rod. If the surface segment is designed so as to be largely inelastic, such a deformation of the bending rod results in a buckling or swiveling of the surface segment with the bending rod as swivel or buckling axis.

A similar or the same swiveling or buckling of the surface segment can naturally also be caused by a deformation of the bending rod perpendicularly to the plane of the surface segment.

According to a further embodiment, the middle section of the bending rod is deformable in an arch-like manner with regard to the longitudinal ends of the bending rod firmly secured on the carrier, wherein the longitudinal ends of the bending rod are firmly secured in position on the carrier in a plane perpendicular to the longitudinal extension of the bending rod. In an initial position, the bending rod can substantially extend straight between opposite sections, approximately between opposite limbs of the carrier. For a deformation of the bending rod caused by swiveling or buckling of the surface segment, it can be provided that only the middle section of the bending rod is deflected by a predetermined amount in a direction perpendicular to the longitudinal extension of the bending rod.

In such case, the bending rod assumes an arch-shaped or curved contour. Said curvature can be achieved in different ways. The arch-shaped curvature of the bending rod can be well and precisely reproduced, and so a required swivel or buckling behavior of the surface segment can be controlled in a particularly simple and good manner.

According to a further embodiment, the middle section of the bending rod is connected to an actuator. The actuator is guided perpendicularly or obliquely slidable to the longitudinal extension of the bending rod on the carrier or the body of the motor vehicle. By means of the actuator, which is connected to the bending rod, and its translational guide on the carrier, the bending rod can be bent and deformed in a precise and well reproducible manner.

According to a further embodiment and instead of an actuator, a pressure piece can be arranged on the carrier which interacts with at least one longitudinal end of the bending rod. By means of the pressure piece, the bending rod is compressible for causing a bending of its middle section in longitudinal direction. By exerting pressure that acts in the longitudinal direction on the bending rod, it can be deformed along a preferred direction, and so the bending rod is subject to an arch-shaped deformation, e.g. because its opposite longitudinal end is firmly secured on the carrier.

The pressure piece itself, for example, can be guided on the carrier in a longitudinally slidable manner. The pressure piece and the longitudinal end of the bending rod interacting with the pressure piece can comprise starting slopes which correspond with one another, and so a translational shift of the pressure piece results in a compression of the bending rod, causing the deformation. In this embodiment, the middle section of the bending rod can also be decoupled from an actuator.

Instead of an actuator interacting with the middle section, in this embodiment it is possible to merely implement a pressure piece provided on the longitudinal end of the bending rod, said pressure piece also being suitable to cause an arch-shaped curvature of the bending rod. For that purpose, the bending rod in its basic position can also have a specific pretension or a specific basic curvature which results in a defined arch-shaped curvature of the bending rod, when the bending rod is compressed in longitudinal direction.

According to a further embodiment of the spoiler arrangement, the bending rod is arranged non-rotatably on the carrier with regard to an imaginary rotational axis which runs in longitudinal direction of the bending rod. For example, the longitudinal ends of the bending rod can have a triangular, rectangular, or other polygonal or angular design which corresponds to a complementary form of a receptacle provided on the carrier. A torque acting on the bending rod due to a buckling of the surface segment can thus be absorbed and deflected to the carrier arranged immovably on the body.

According to a further embodiment, the bending rod is pivotably mounted on the carrier with regard to a rotational axis running perpendicularly to the plane of the surface segment and perpendicularly to the longitudinal direction of the bending rod. In this case, particularly the longitudinal ends of the bending rod are exclusively pivotably mounted. For that purpose, at least one of the longitudinal ends of the bending rod can be coupled with a rotatable shaft or control cam which is designed to apply a torque, which bends the bending rod, to one of the longitudinal ends. In this case, an actuator provided approximately centered on the bending rod could be foregone. As a result, a very compact design of the spoiler arrangement can be realized.

According to a further embodiment, the bending rod has a straight profile in its basic position. It is transferable to a bent action position against a reset force. This is advantageous because the bending rod is designed to hold the lamella in its basic position or basic configuration. The actuator provided for the deformation of the bending rod can in this case be implemented relatively compactly and cost-effectively. The actuator can be designed as unidirectional actuator and exert only a one-directional force on the bending rod. Insofar, the actuator can be designed as tractive and/or pressure element, e.g. in the form of an actuating traction.

According to an alternative embodiment, the bending rod in its basic position has a bent profile. It is transferable to a straight-line or almost straight-line action position against a reset force. In a curved basic position, the bending rod can be preloaded and, in accordance with an interaction with the actuator, be transferred from the basic position to the action position against or with the preload. An opposite movement or deformation of the bending rod back to the basic position can be effected by the inherent elastic reset force of the bending rod.

According to a development, it is further provided that the bending rod is formed from a thermoplastic. For example, the bending rod can be made of polyamide, polypropylene, or polyethylene, or plastic mixtures formed therefrom. The bending rod can particularly be designed as plastic extrusion component or as injection molding component. The surface segment, which is typically connected to and firmly secured on the bending rod along its entire longitudinal extension, can comprise or be formed from an organo-sheet. Organo-sheets are fiber-reinforced composites which are typically available as fiber-matrix semi-finished products. They typically comprise a fiber fabric or fiber mats which are embedded in a thermoplastic matrix.

Possible fiber materials to be used for the matrix are glass, aramid and carbon. According to the fiber orientation and fiber geometry, the organo-sheet can have anisotropic mechanical and/or anisotropic thermal properties. The swivel and buckling behavior of the organo-sheet or a surface segment made therefrom can be adjusted specifically to the intended purpose provided herein.

According to a further aspect, a motor vehicle is further provided, having a vehicle front, on which at least one previously described spoiler arrangement is arranged. The spoiler arrangement can be configured as front spoiler or wheel spoiler. In an embodiment as a front spoiler, the spoiler arrangement extends almost over the entire vehicle width. For that purpose, the spoiler arrangement is typically arranged on an underside of a front overhang of the body of the motor vehicle. The lamella has an extension which is at least as long as the gap between the two front wheels.

In an embodiment as a wheel spoiler, each of the two front wheels is typically associated with its own spoiler arrangement. The spoiler arrangements are each located upstream of one of the front wheel on an underside of a front overhang of the body of the motor vehicle. A design as a wheel spoiler is particularly provided, when the motor vehicle is configured as an SUV (sport utility vehicle). Insofar, the motor vehicle, according to a further embodiment, can be configured as an SUV and comprise at least two previously described spoiler arrangements designed as front-side or also as rear-side wheel spoilers. The width of the spoiler arrangement in vehicle transverse direction (y) corresponds in this case at least to the width of the front or rear wheels.

Preferably, the spoiler arrangements are designed so as to be somewhat wider than the corresponding wheels of the motor vehicle.

In both embodiments as front spoiler and rear spoiler, the spoiler arrangement is used to improve and optimize the wind resistance of the motor vehicle, particularly when it is driven at high speeds, for example, at more than 50 km/h.

According to a further embodiment of the motor vehicle, it comprises a controller which is coupled with the actuator and which is designed to move the actuator for swiveling the lamella according to the vehicle speed. As a result, the spoiler arrangement can be adjusted in accordance with the speed of the vehicle. When driving within a comparatively low speed range, the spoiler arrangement can assume a folded-up position, in which the lamellas can bear almost planarly against the underside of the front overhang of the motor vehicle body.

When driving within a comparatively high speed range, the spoiler arrangement can assume a folded-out position, in which particularly an end section of the lamella which faces away from the bending rod protrudes from the underside of the front overhang. As a result, the approaching air can be guided in an aerodynamically particularly favorable manner along the vehicle front or past the vehicle front.

Depending on intended purpose and configuration, the basic position of the spoiler arrangement can coincide either with the folded-up or the folded-out position. The same applies correspondingly to the action position. In this position, the spoiler arrangement can either bear against the underside of the front overhang or protrude from the underside.

BRIEF DESCRIPTION OF THE DRAWINGS

The present invention will hereinafter be described in conjunction with the following drawing figures, wherein like numerals denote like elements.

FIG. 3 shows a schematic depiction of an individual lamella of a spoiler arrangement having a bending rod located below;

FIG. 4 shows a side view of the lamella according to FIG. 3;

FIG. 5 shows a schematic depiction of a lamella according to FIG. 3, deformed due to a bending of the bending rod, FIG. 6 shows a side view of the lamella according to FIG. 5, FIG. 7 shows a schematic side view of an embodiment of the spoiler arrangement in action position;

FIG. 8 shows the spoiler arrangement according to FIG. 7, but in its basic position;

FIG. 9 shows a schematic side view of a further embodiment of the spoiler arrangement in action position;

FIG. 10 shows the spoiler arrangement according to FIG. 9, but in its basic position;

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
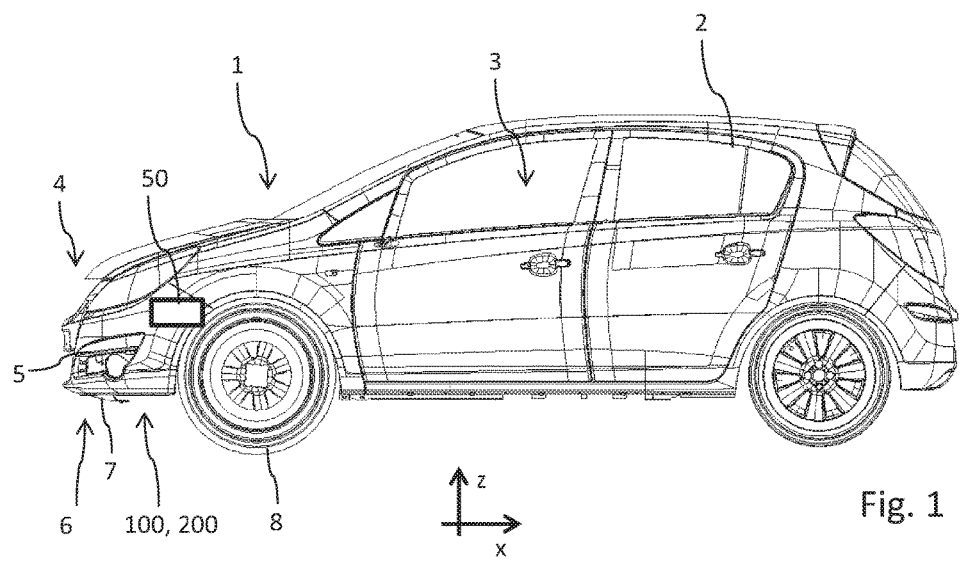
FIG. 1 shows a side view of a motor vehicle configured as a passenger car.
Figures 2A, 2B:
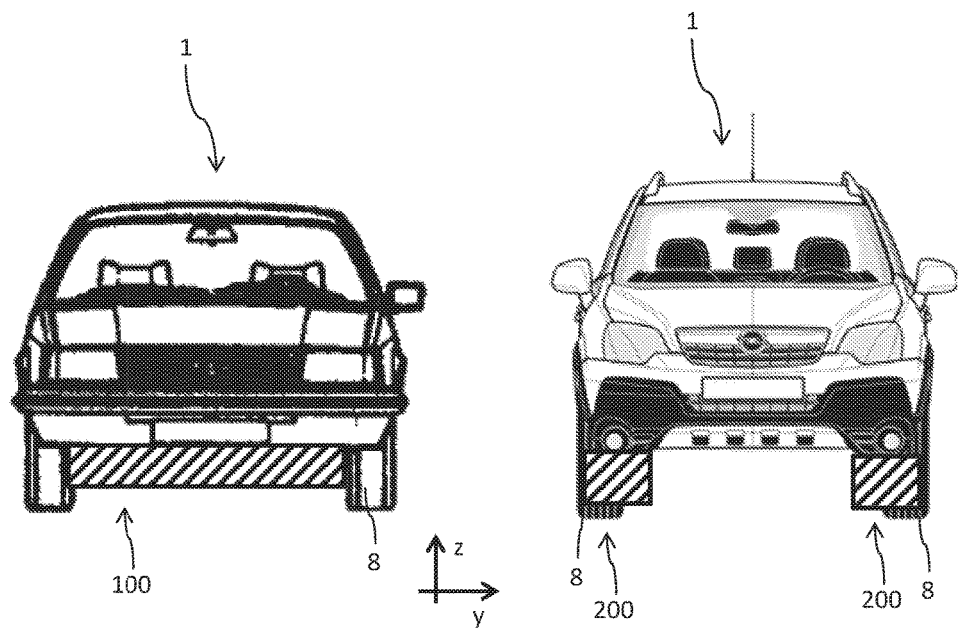
FIG. 2a shows an exemplary front view of a motor vehicle having a front spoiler.
FIG. 2b shows an exemplary front view of a motor vehicle configured as an SUV, having two front-side wheel spoilers.

The motor vehicle 1 shown as a side view in FIG. 1 comprises a motor vehicle body with an interior 3 serving as a passenger cabin. Toward the front, in the direction of travel of the motor vehicle 1, the motor vehicle body 2 ends with a vehicle front 4, which is shown exemplary in FIGS. 2a and 2b schematically as top view for two different motor vehicles. More specifically, FIG. 2a shows a spoiler arrangement 100 designed as a front spoiler, while FIG. 2b shows two spoiler arrangements 200 designed as wheel spoilers, each arranged upstream of one of the front wheels 8.

The spoiler arrangements 100, 200 are each arranged on an underside 7 of a front overhang 6 of the motor vehicle body 2. The spoiler arrangements 100, 200 comprise a carrier 40, which is only implied in FIGS. 3 to 5 and shown schematically in FIGS. 11 and 12. The carrier 40 can serve as a separate component, i.e. as a support structure and as an installation platform for the spoiler arrangement 100, 200 which can be made available as an assembly or add-on module. However, it can also be part of the vehicle body 2.

The spoiler arrangements 100, 200 each comprise at least one lamella 20 which is movable or deformable between an action position shown in FIGS. 7 and 9 and a basic position G shown in FIGS. 8 and 10. In action position A according to FIGS. 7 and 9, the corresponding lamella 20 extends downward from the front overhang 6. In the basic position G shown in FIGS. 8 and 10, the lamella 20 is effectively folded and pivoted upward, and so it largely bears with its entire surface against the underside 7 of the front overhang 6.

The functionality and the structure of an individual lamella 20 can be explained in more detail using FIGS. 3 to 6. The lamella 20 comprises a longitudinally extending bending rod 22 which is arranged or firmly secured on opposite longitudinal ends 25, 26 on the carrier 40 or directly on the motor vehicle body 2. The lamella 20 further comprises a substantially plane surface segment 24. The surface segment 24 or surface structure has an approximately rectangular contour. The longitudinal extension of the surface segment 24 approximately corresponds to the longitudinal extension of the bending rod 22. Along a side edge 27, which faces the bending rod 22, the surface segment 24 is firmly connected to the bending rod 22 and immovably secured on the bending rod 22. For example, the bending rod 22 and the surface segment 24 can be firmly integrally bonded with one another along the entire side edge 27.

While the bending rod 22 is designed so as to be elastic and flexible, the surface segment 24 is largely or substantially designed so as to be inelastic. The material, from which the surface segment 24 is formed, is not or only to a very small degree elastic, and so is not or only to a limited extent able to follow a bending movement of the bending rod 22. The surface segment can nonetheless be elastic and follow a bending movement of the bending rod 22.

A middle section 23 of the bending rod 22 is located between the opposite longitudinal ends 25, 27 of the bending rod. If said middle section 23 is deflected in accordance with the arrow S in FIG. 5 in a direction perpendicular to the longitudinal extension of the bending rod 22, the side edge 27 of the surface segment is subject to a deformation which corresponds to the deformation of the bending rod 22. Due to a comparatively long extension along its longitudinal ends 29, 30, a side edge 28 of the surface segment 24, which faces away from the bending rod 22, is located at a relatively great distance from the bending rod 22.

Due to the inelasticity of the surface segment 24, this side edge 28 cannot be deformed in a similar manner as the side edge 27. The result is a swivel or buckling movement of the surface segment 24 to a bent surface segment 24', as indicated in FIG. 5 and shown as cross-section in FIG. 6. If the surface segment 24, despite a deformation of the bending rod 22, wanted to remain in the initial plane, it, particularly its side edge 28, would have to execute a stretching with regard to the side edge 27. However, due to the inelasticity of the material of the surface segment 24, this is not possible. As a result, a swivel or buckling movement of the surface segment 24 toward a bent surface segment 24', as is shown schematically in FIG. 6, can be affected and controlled by the elastic deformation and arch-like bending of the middle section 23 of the bending rod 22.

A swivel or buckling movement of the surface segment 24 toward a bent surface segment 24' is effected by a bending of the middle section 23 of the, e.g. initially straight bending rod 22 toward an arch-like curved bending rod 22'. The initially straight lamella 20 deforms in a manner shown as cross-section in FIG. 6. With the bent lamella 20', the surface segment 24 buckles against the bending direction. In such case, the middle section 23 of the bending rod 22 is subject to a sliding movement with regard to the longitudinal ends 25, 26 of the bending rod in a direction perpendicular to the plane of the surface segment 24.

With a deformation of the bending rod 22 shown as a dotted line in FIG. 6, the surface segment 24 is subject to a downward directed folding or swivel movement. In this action position, the surface segment 24 protrudes downward with its free side edge 28.

The bending rod 22 is typically elastically deformed, e.g. by means of an actuator 46, indicated in FIG. 5, which is designed to exert a tensile force and/or a pressure force onto the middle section 23 of the bending rod 22. The actuator can be configured as electric or pneumatic actuator. It can have its own drive which can be actuated and controlled by means of a controller 50. The controller 50 can be implemented as a separate controller 50. However, it can also be part of a motor vehicle control device. The controller 50 is at least coupled with the vehicle or on-board electronics. For that purpose, the controller is designed to execute an adjustment movement of the spoiler arrangement 100, 200 on the basis of the vehicle speed.

When driving within a comparatively high speed range, approximately above 50 km/h, the controller 50 can transfer the spoiler arrangement 100, 200 to the action position A and fold out the lamelle 20 accordingly. When driving within a comparatively low speed range, approximately below 50 km/h, the controller 50 can transfer the spoiler arrangement 100, 200 to the basic position G and fold up the lamelle 20 correspondingly.

The actuator 46 is, e.g. slidably, typically translationally slidably attached to the carrier 40 itself or to the body 2. Depending on the design of the spoiler arrangement 100, 200, the actuator 46 can be movably mounted approximately in a plane which is perpendicular to the plane of the surface segment 24. For example, it can be slidably guided, as can be seen when comparing FIGS. 7 and 8, in approximately horizontal and substantially in vehicle longitudinal direction (x) on the body 2 or on the carrier 40.

In the embodiments of FIGS. 9 and 10, the actuator 46 is slidably mounted perpendicularly to the longitudinal extension of the bending rod 22 but in the plane or parallel to the plane of the surface segment 24. For example, it can be slidably guided, as can be seen when comparing FIGS. 9 and 10, in approximately vertical and substantially in vehicle vertical direction (z) on the body 2 or on the carrier 40.

In the basic position G according to FIGS. 8 and 10, the bending rod 22 can be designed so as to be either curved or substantially straight. If it is curved, when in the basic position G, it assumes a substantially straight form, when in action position A. If the bending rod 22 is straight, when in the basic position G, it assumes a substantially curved form, when in action position A. Therefore, different configurations are conceivable, in which the lamella 20 in basic position G is either folded out or folded up. The lamella 20 can thus be transferred to the corresponding other position by means of the actuator 46.

Figure 11:
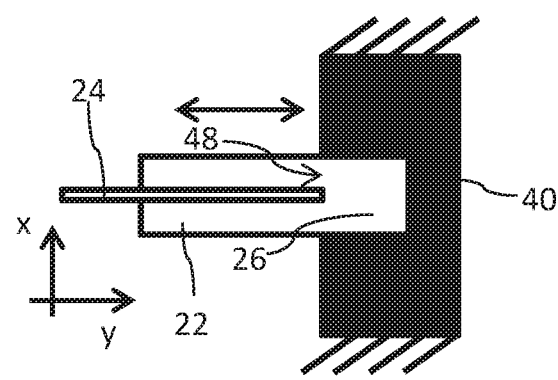
FIG. 11 shows a cross-section of a longitudinal end of a lamella according to FIG. 9, which is guided longitudinally slidably on the carrier.

FIG. 11 shows a cross-section of a linkage of a longitudinal end 26 of the bending rod 22 on the carrier 40. The carrier 40 comprises a longitudinally extended guide groove 48 which extends parallel to the longitudinal direction of the bending rod 22. By means of the guide groove 48, which, in the present example has a predetermined depth in vehicle transverse direction (y), the longitudinal end 26 of the bending rod 22 of the lamella 20 can be guided longitudinally slidably on the carrier 40. As a result, the bending rod 22 can be bent in an arch-shaped manner without disengaging from the carrier 40.

Figure 12:
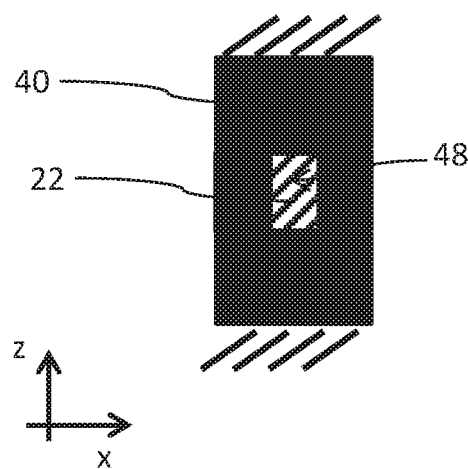
FIG. 12 shows a schematic front-side view of the spoiler arrangement firmly secured on the carrier.

FIG. 12 shows a side view of the carrier 40 surrounding the longitudinal end 26 of the bending rod 22. The groove 48 has an angular or other inner contour that deviates from a rotationally symmetrical design, in which the corresponding longitudinal end 26 of the bending rod 22 is non-rotatably held. However, as shown in FIG. 3, the bending rod 22 can coincide with an imaginary rotational axis 32 and insofar form a rotational or swivel axis for the lamelle 20. Since the outer contour of the longitudinal end 26 of the bending rod 22 is guided precisely in the groove 48 of the carrier 40, the bending rod is arranged non-rotatably on the carrier 40.

Of course, on both sides, i.e. on both opposite longitudinal ends 26, 28 of the bending rod, carriers 40 are provided, each having a guide groove 48. For the non-rotatable mounting or non-rotatable longitudinal shift of the bending rod 22 on the carrier 40, it suffices if only one of the longitudinal ends 26, 28 is guided non-rotatably on the corresponding carrier 40.

The spoiler arrangement 100, 200, in which a pivoting or folding of the lamelle 20 can be caused and continuously adjusted by means of a deformation of the bending rod 22, can be realized with comparatively few movable components. This decreases the repair susceptibility and, in addition to a weight reduction of the vehicle 1, it also improves the durability and robustness of such a spoiler arrangement 100, 200.

The depicted embodiments merely show possible designs of the development, for which further numerous variations are conceivable and within the scope of the development. The exemplary depicted embodiments are in no way to be interpreted to be delimiting with regard to scope, applicability, or configuration possibilities of the development. The present description illustrates to a person skilled in the art only one possible implementation of an embodiment according to the invention. The most diverse modifications can be applied to function and arrangement of described elements without departing from the scope of protection or its equivalents defined by the following claims.

The invention claimed is:

1. A spoiler arrangement for a motor vehicle comprising:
a carrier configured to attached on a body of the motor vehicle; and
a lamella arranged on the carrier, the lamella including an elongated elastic bending rod and at least one surface segment;
wherein the surface segment is connected to the bending rod along a side edge.

2. The spoiler arrangement according to claim 1, wherein the bending rod comprises two opposite longitudinal ends attached to the carrier.

3. The spoiler arrangement according to claim 2, wherein at least one longitudinal end of the bending rod is slidably guided on the carrier along a longitudinal axis of the bending rod.

4. The spoiler arrangement according to claim 1, wherein the surface segment is subject to a swivel movement due to a deformation of the bending rod along a swivel axis of the bending rod.

5. The spoiler arrangement according to claim 1, wherein the surface segment is subject to a buckling movement due to a deformation of the bending rod along a buckling axis of the bending rod.

6. The spoiler arrangement according to claim 1, wherein the bending rod comprises a middle section deformable perpendicularly to a longitudinal axis of the bending rod for pivoting of the surface segment between a basic position and an action position.

7. The spoiler arrangement according to claim 6, wherein bending rod further comprises two opposite longitudinal ends, each end firmly secured on the carrier in a plane which is perpendicular to the longitudinal axis of the bending rod and the middle section of the bending rod is deformable in an arch-like manner with regard to the longitudinal ends of the bending rod.

8. The spoiler arrangement according to claim 6, further comprising an actuator operably coupled to the middle section of the bending rod, wherein the actuator is slidably guided relative to the longitudinal axis of the bending rod on a the carrier.

9. The spoiler arrangement according to claim 6, wherein the bending rod in the basic position has a curved profile and is transferable against a reset force to a straight action position.

10. The spoiler arrangement according to claim 1, wherein the bending rod, is arranged non-rotatably on the carrier with respect to a rotational axis about a longitudinal axis of the bending rod.

11. The spoiler arrangement according to claim 1 wherein the bending rod is pivotably mounted on the carrier with respect to a rotational axis oriented perpendicularly to a plane of the surface element and perpendicularly to a longitudinal axis of the bending rod.

12. The spoiler arrangement according to claim 1, wherein the bending rod has a straight profile in the basic position and is transferable against a reset force to a bent action position.

13. The spoiler arrangement according to claim 1, wherein the bending rod comprises a thermoplastic rod and the surface segment is formed from an organo-sheet.

14. A motor vehicle comprising a vehicle front including the body on which the spoiler arrangement according to claim 1 is attached.

15. The motor vehicle according to claim 14, wherein the spoiler arrangement is configured as a front spoiler.

16. The motor vehicle according to claim 14, further comprising a controller operably coupled with an actuator configured to pivot the lamella based on a speed of the motor vehicle.

17. A spoiler arrangement for a motor vehicle comprising:
a carrier configured to attach on a body of the motor vehicle;
a lamella arranged on the carrier, the lamella including at least one surface segment and an elongated elastic bending rod having a middle section and two opposite longitudinal ends, each end firmly secured on the carrier in a plane which is perpendicular to the longitudinal axis of the bending rod, wherein the surface segment is connected to the bending rod along a side edge; and
an actuator coupled to the middle section of the bending rod and operable to elastically deform the bending rod perpendicularly to a longitudinal axis of the bending rod for pivoting of the surface segment between a basic position and an action position and at least one surface segment.

* * * * *